Patented May 30, 1933

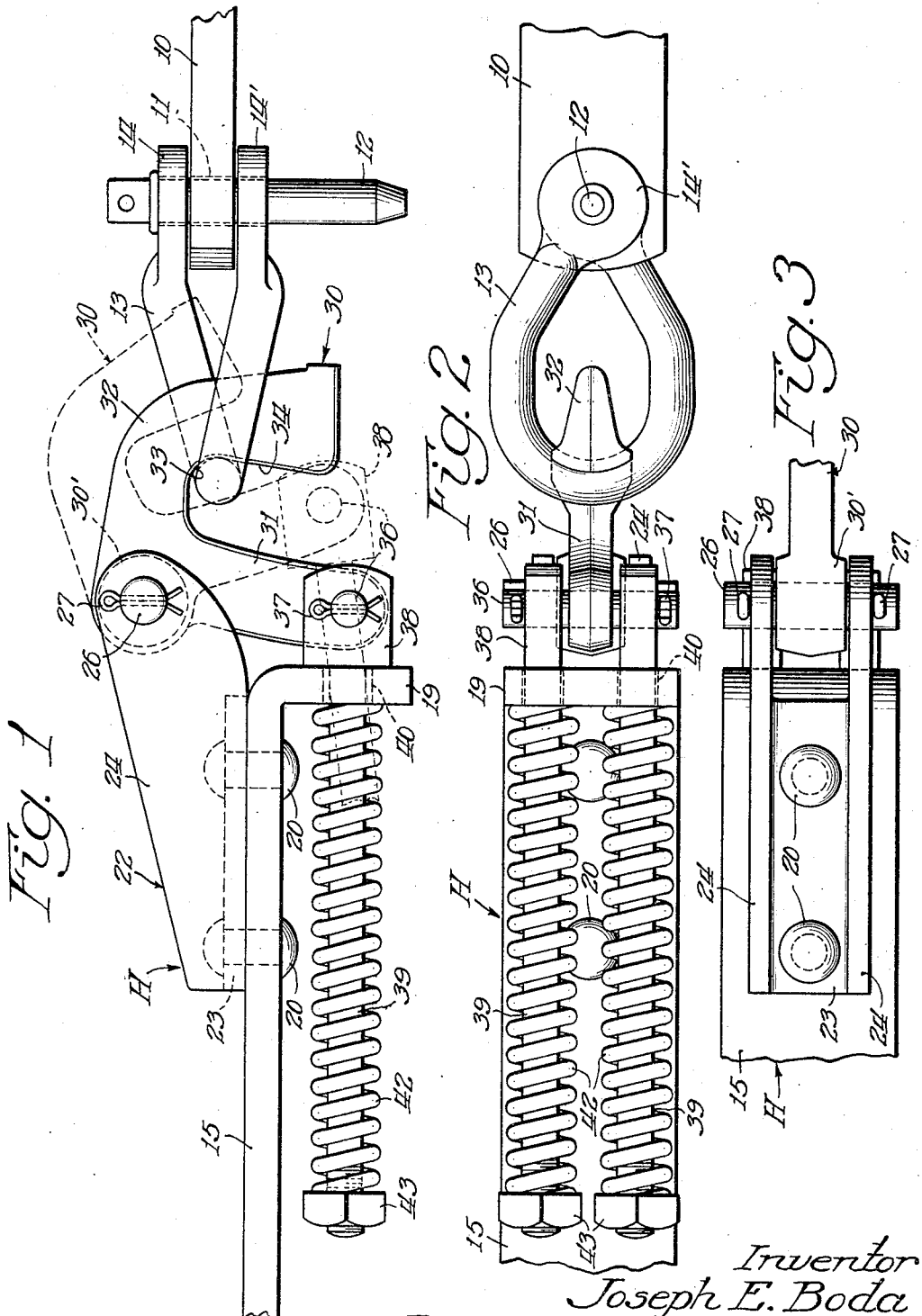

1,911,743

UNITED STATES PATENT OFFICE

JOSEPH E. BODA, OF ROCKFORD, ILLINOIS, ASSIGNOR TO J. I. CASE COMPANY, OF RACINE, WISCONSIN, A CORPORATION OF WISCONSIN

HITCHING MEMBER

Application filed August 3, 1931. Serial No. 554,758.

My invention relates generally to agricultural devices and the like and has to do more particularly with a member for attaching a source of locomotion, such as a tractor or the like, to an agricultural implement or, in general, to any device which is to be moved over the ground by motive means outside of itself.

A particular object of my invention is to provide a hitching member which will be simple in construction, inexpensive to fabricate, efficient, certain and simple in operation, easy to connect and disconnect with the source of locomotion, and in general to provide a new and improved hitching member such as will be described below.

A further object is to provide such a device which will automatically disconnect itself from the tractor upon engagement of the implement with an obstacle and will immediately be in condition for reconnection, without the necessity of further adjustment.

Still another object is to provide in such a device adjustable means whereby the device will disconnect itself from the tractor upon application of a predetermined force.

Various other advantages will become apparent as the description proceeds.

Referring now to the drawing forming a part of this specification and illustrating a preferred embodiment of my invention:—

Fig. 1 is a side elevational view of an improved hitching member and parts connected thereto.

Fig. 2 is a bottom plan view of the same; and

Fig. 3 is a fragmentary top plan view of the same.

Numeral 10 represents a tractor draw bar, the bar being apertured as at 11 adjacent its end and having seated in said aperture a headed pin 12 which serves to retain a loop member 13. The loop member has a pair of eye portions 14, 14' disposed on opposite sides of the bar 10, through which eyes the pin 12 passes to secure the lop pivotally to the draw bar. The loop member 13 cooperates with the improved hitching member indicated generally at H.

The hitching member comprises a bar 15 having a depending vertical end flange 19. Secured to the top of the horizontal bar 15 as by means of rivets 20 or the like, is a roughly channel-shaped member 22 comprising a web portion 23 and leg portions 24. It will be noted that the leg portions extend a slight distance beyond the end of the bar 15 and are apertured adjacent their ends to seat a pintle 26. This pintle may be retained by cotter pins 27 or other suitable means.

Rotatably mounted on the pintle 26 is a dog 30. This dog is preferably in the form of a bell crank lever having an apertured hub portion 30' engaging the pintle 26 and with a leg portion 31 depending substantially vertically from the hub portion and a leg portion 32 which projects laterally from the hub and thence downwardly as shown clearly in Fig. 1, so as to provide a concave surface 33 and an adjacent substantially straight surface 34.

The leg portion 31 of the dog 30 is perforated to receive a pintle 36 which is secured as by means of cotter pins 37 or the like to enlarged heads 38 of a pair of bolts 39. These bolts extend through apertures 40 in the vertical flange 19 of the bar 15 and coiled thereon is a pair of helical compression springs 42, these springs being retained by means of nuts 43 or the like threaded on the ends of the bolts 39.

In the operation of the device, the bar 15 is secured to the agricultural implement or other device to be drawn over the ground and the draw bar 10, secured to a tractor or the like, is connected to the hitching member by attaching the loop 13 to the dog 30 as shown in full lines in Fig. 1, the loop seating in the concave surface 33 of the dog member. Normally the dog will be in such a position that the surface 34 slants slightly beyond the vertical so that a portion of the leg 32 will lie under the loop, and the latter will thus be firmly retained. The tension of the springs 42 will have been adjusted by means of the nuts 43 so that these springs will yield upon the application of a predetermined force to permit the dog 30 to rotate to a position such as is shown in dotted lines in Fig. 1, as when the agricultural implement encounters an obstacle such as a root, stone, stump or the like.

When this occurs, it will be apparent that the leg 32 will be rotated to such a position that the surface 34 no longer underlies that portion of the loop member 13 which normally seats in the concavity 33 of the dog, as shown dotted in Fig. 1. Hence any further movement of the tractor will result in pulling the loop 13 out of engagement with the dog, thus disconnecting the tractor from the agricultural implement.

Obviously the dog 30, as soon as it has been disengaged from the loop 13, will immediately be returned by the action of the springs 42 to its normal position as shown in full lines in Fig. 1. Hence it is ready for reengagement with a drawing device without the necessity of being reset.

Various changes, modifications and improvements coming within the spirit of my invention will doubtless occur to those skilled in the art, and hence I do not wish to be limited to the specific embodiment disclosed herein or uses mentioned, except as set forth in the appended claims, which are to be interpreted as broadly as the state of the art will permit.

I claim:

1. In a device of the class described, a supporting member, a lever having a normal point of application of a pulling member, said lever being pivoted to said supporting member at a point spaced from the line of pull, a substantially horizontal plunger slidably carried by said supporting member and pivotally connected directly to said lever, and a helical spring coiled upon said plunger and adapted to yield upon the application of a predetermined force to said lever so as to permit disengagement of the latter from a pulling member, said spring and plunger acting automatically to restore said lever to normal position when released from said force, and said parts being so arranged that the amount of force required to disengage said lever from said pulling member is not substantially less than any force required to rotate said lever up to the point of disengagement.

2. In a device of the class described, a supporting member, a lever having a normal application of a pulling member, said lever being pivoted to said supporting member at a point spaced from the line of pull, a substantially horizontal plunger slidably carried by said supporting member and pivotally connected directly to said lever, and a helical spring coiled upon said plunger and adapted to yield upon the application of a predetermined force to said lever so as to permit disengagement of the latter from a pulling member, said spring and plunger acting automatically to restore said lever to normal position when released from said force, means for limiting displacement of said plunger by said spring, and means for adjusting the tension of said spring.

3. In a device of the class described, a supporting member, comprising a substantially horizontal bar having a substantially vertical flange, a lever having a normal point of application of a pulling member, said lever being pivoted to said supporting member at a point vertically spaced from the line of pull, a substantially horizontal plunger slidably carried by said flange and pivoted directly to said lever, a helical spring coiled on said plunger, means retaining said coil spring on said plunger and adjustable to vary the tension thereof, and means for limiting the displacement of said plunger by said spring, said plunger being displaceable against the action of said spring to permit unseating of a pulling member from said lever, and said spring acting automatically thereafter to restore said lever to normal position for reengagement with a pulling member.

4. In a device of the class described, a supporting member, a connecting member having a normal point of application of a pulling member, said member being pivoted to said supporting member at a point spaced from the line of pull, said connecting member being substantially in the form of a bell crank lever, one of the legs of which is adapted to engage a pulling member, and a resilient member secured directly to the other leg of said bell crank lever, said resilient member being disposed under said supporting member, said connecting member being adapted to rotate upon the application of a predetermined force thereto to permit unseating of said pulling member and said resilient member acting automatically to restore said connecting member to normal position when released from said force.

5. In a device of the class described, a supporting member, a connecting member having a normal point of application of a pulling member, said member being pivoted to said supporting member at a point spaced from the line of pull, said connecting member being substantially in the form of a bell crank lever, one of the legs of which is adapted to engage a pulling member, and a resilient member disposed under said supporting member and secured directly to the other leg of said bell crank lever on the opposite side of the line of pull to that of the pivot of said connecting member, said connecting member being adapted to rotate upon the application of a predetermined force thereto to permit unseating of said pulling member and said resilient member acting automatically to restore said connecting member to normal position when released from said force.

6. In a device of the class described, a supporting member, a connecting member having a normal point of application of a pulling member, said member being pivotally carried by said supporting member, the pivot thereof being spaced from the line of pull, said connecting member being substantially in the form of a bell crank lever one leg of which provides a surface for engaging a pulling member, and a horizontally slidable resilient plunger carried by said supporting member, said plunger acting directly on the other leg of said bell crank lever and adapted to permit rotation of the latter upon the application of a predetermined force thereto so as to permit the unseating of a pulling member therefrom and acting automatically thereafter to restore said connecting member to normal position.

7. In a device of the class described, a supporting member comprising a substantially horizontal bar having a vertical flange adjacent one end thereof, a connecting member having a normal point of application of a pulling member, said member being pivotally carried by said supporting member, said pivot being vertically spaced from the line of pull, said connecting member being in the form of a bell crank lever, one leg of which is adapted to engage a pulling member, a plunger horizontally slidably carried by said vertical flange and having a helical spring coiled thereon, said plunger being directly pivoted to the other leg of said bell crank lever, said spring being adjustable to permit displacement of said connecting member upon the application of a predetermined force thereto, whereby a pulling member may be automatically disconnected therefrom, and said spring acting automatically thereafter to restore said connecting member to normal position.

8. A device as defined in claim 3 wherein said plunger is arranged under said horizontal bar and substantially parallel therewith.

9. A device as defined in claim 7 wherein said plunger is arranged under said horizontal bar and substantially parallel therewith.

10. A device as defined in claim 5 wherein said resilient member is directly connected to the bell crank lever.

JOSEPH E. BODA.